(12) United States Patent
Golman et al.

(10) Patent No.: US 12,043,201 B1
(45) Date of Patent: *Jul. 23, 2024

(54) DEPLOYABLE PANEL OR RAIL WITH REACTION SURFACE

(71) Applicant: APPLE INC., Cupertino, CA (US)

(72) Inventors: Adam J. Golman, Glen Allen, VA (US); Nathaniel J. Dennis, Saratoga, CA (US); Jesse T. Buehler, Portola Valley, CA (US); Jonathan O. Sive, San Carlos, CA (US); Donald R. Monroe, Los Gatos, CA (US); Mikael P. Sedlacek, Carmel Valley, CA (US); Arturo Llamazares Domper, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,552

(22) Filed: Apr. 21, 2023

Related U.S. Application Data

(63) Continuation of application No. 17/514,208, filed on Oct. 29, 2021, now Pat. No. 11,667,258.

(60) Provisional application No. 63/126,154, filed on Dec. 16, 2020.

(51) Int. Cl.
| | |
|---|---|
| *B60R 21/2334* | (2011.01) |
| *B60R 21/214* | (2011.01) |
| *B60R 21/264* | (2006.01) |
| *B60R 21/16* | (2006.01) |

(52) U.S. Cl.
CPC ........ *B60R 21/2334* (2013.01); *B60R 21/214* (2013.01); *B60R 21/264* (2013.01); *B60R 2021/161* (2013.01)

(58) Field of Classification Search
CPC .................................................. B60R 21/207
See application file for complete search history.

(56) References Cited

U.S. PATENT DOCUMENTS

| | | |
|---|---|---|
| 3,664,682 A | 5/1972 | Wycech |
| 4,536,008 A | 8/1985 | Brown, Jr. |
| 6,189,960 B1 | 2/2001 | Mumura et al. |
| 6,722,691 B1 | 4/2004 | Haland et al. |
| 6,935,456 B2 | 8/2005 | Korechika et al. |
| 6,942,261 B2 | 9/2005 | Larsen et al. |
| 9,333,934 B2 | 5/2016 | Sitko |
| 10,399,527 B2 | 9/2019 | Schütt et al. |

(Continued)

FOREIGN PATENT DOCUMENTS

| | | | |
|---|---|---|---|
| CN | 114269608 A * | 4/2022 | ........... B60R 21/207 |
| DE | 4307175 A1 | 9/1993 | |

(Continued)

*Primary Examiner* — Nicole T Verley
(74) *Attorney, Agent, or Firm* — Young Basile Hanlon & MacFarlane, P.C.

(57) ABSTRACT

A support surface includes a support back, a housing defined within the support back, a restraint having a stowed position disposed within the housing, and a panel or a rail having a stowed position disposed within the housing. The support surface includes an anchor that couples an outer edge of the restraint to an outer edge of the panel or the rail. The panel or the rail is configured to guide the anchor and the restraint in traveling from the stowed positions to a deployed position spaced apart from the housing and the support back.

20 Claims, 8 Drawing Sheets

(56) References Cited

U.S. PATENT DOCUMENTS

| | | |
|---|---|---|
| 10,486,637 B2 | 11/2019 | Thomas et al. |
| 10,556,564 B2 | 2/2020 | Lee et al. |
| 10,604,103 B2 | 3/2020 | Lee et al. |
| 10,688,955 B2 | 6/2020 | Shin et al. |
| 10,836,340 B2 | 11/2020 | Obayashi et al. |
| 10,960,839 B2 | 3/2021 | Imura et al. |
| 11,014,523 B2 | 5/2021 | Min et al. |
| 11,247,632 B2 | 2/2022 | Malapati et al. |
| 11,254,277 B2 | 2/2022 | Jeong |
| 11,370,381 B1 | 6/2022 | Mihm |
| 11,420,583 B1 | 8/2022 | Farooq et al. |
| 11,491,945 B2 | 11/2022 | Abramczyk et al. |
| 2002/0125690 A1 | 9/2002 | Boll et al. |
| 2005/0001412 A1 | 1/2005 | Schneider et al. |
| 2005/0046159 A1 | 3/2005 | Noguchi et al. |
| 2005/0062264 A1 | 3/2005 | Arwood et al. |
| 2012/0133114 A1 | 5/2012 | Choi et al. |
| 2017/0015269 A1 | 1/2017 | Min et al. |
| 2019/0111885 A1 | 4/2019 | Hwangbo et al. |
| 2019/0248322 A1 | 8/2019 | Herzenstiel et al. |
| 2019/0366968 A1 | 12/2019 | Park et al. |
| 2019/0375361 A1 * | 12/2019 | Markusic ............. B60R 21/231 |
| 2020/0086820 A1 | 3/2020 | Gould et al. |
| 2020/0223387 A1 | 7/2020 | Min |
| 2021/0053525 A1 | 2/2021 | Deutschmann et al. |
| 2022/0097644 A1 | 3/2022 | Jaradi et al. |
| 2022/0203923 A1 | 6/2022 | Jaradi et al. |

FOREIGN PATENT DOCUMENTS

| | | | |
|---|---|---|---|
| DE | 19643322 A1 | 4/1997 | |
| DE | 102019203316 A1 * | 9/2019 | ............. B60N 2/427 |
| DE | 102019116586 A1 * | 12/2020 | ............ B60R 21/207 |
| DE | 102020120496 A1 | 2/2021 | |
| GB | 2586494 A | 2/2021 | |
| KP | 2020016550 A | 2/2020 | |
| WO | 2020254218 A1 | 12/2020 | |
| WO | WO-2020254218 A1 * | 12/2020 | ............ B60R 21/207 |

\* cited by examiner

DEPLOYABLE PANEL OR RAIL WITH REACTION SURFACE

CROSS-REFERENCE TO RELATED APPLICATION(S)

This application is a continuation of U.S. patent application Ser. No. 17/514,208, filed Oct. 29, 2021, which claims priority to U.S. Provisional Application Ser. No. 63/126,154, filed Dec. 16, 2020, the contents of which are incorporated herein by reference.

TECHNICAL FIELD

This disclosure relates generally to restraint systems and specifically to restraints, supports, and anchors within restraint systems.

BACKGROUND

In conventional cabins, surfaces such as a dash panel, a windshield, a door, a pillar, a roof rail, or combinations thereof can serve as anchor points and reaction surfaces for a support that deploys from a steering wheel, a roof rail, or the dash panel to prohibit an occupant from impacting these (or other) structures.

In cabins with modular seating systems, such as in seating systems that can be arranged into a configuration consistent with the cabin serving as a mobile office or a living room, options for conventional reaction surfaces and anchor points are limited. In the absence of adequate anchors or reaction surfaces, supports may be unable to be positioned effectively. New approaches to occupant supports are thus desired.

SUMMARY

One aspect of the disclosure is an occupant safety system for a vehicle. The occupant safety system includes an airbag configured to deploy from an interior surface of a vehicle and restrain motion of an occupant relative to the vehicle. The occupant safety system also includes a support coupled to the airbag via an anchor. The support is configured to guide the anchor in traveling from a stowed position proximate to the interior surface of the vehicle to a deployed position spaced apart from the interior surface in unison with deployment of the airbag. The support is also configured to control a direction of deployment of the airbag.

Another aspect of the disclosed embodiments is an occupant safety system for a vehicle. The occupant safety system includes an airbag configured to deploy from an interior surface of a vehicle and restrain motion of an occupant relative to the vehicle. The occupant safety system includes a support coupled to the airbag and configured to telescopically extend from a stowed position behind the interior surface of the vehicle to a deployed position spaced apart from the interior surface in unison with deployment of the airbag. The support is configured to orient the airbag in respect to motion of the occupant.

Another aspect of the disclosed embodiments is an occupant safety system for a vehicle. The occupant safety system includes an airbag configured to deploy from an interior surface of a vehicle and restrain motion of an occupant relative to the vehicle. The occupant safety system also includes a support including a reaction surface configured to deploy from the interior surface of the vehicle in unison with deployment of the airbag. Motion of the occupant relative to the vehicle is retrained by the airbag abutting the reaction surface during deployment. The occupant safety system also includes an anchor coupling the support and the airbag. The anchor is configured to travel from a stowed position behind the interior surface of the vehicle to a deployed position spaced apart from the interior surface in unison with deployment of the airbag and the support.

DETAILED DESCRIPTION

Occupant safety systems are described for use in vehicle cabins lacking easy access to anchor locations, for example, due to changeable seating configurations or an open vehicle cabin design. The safety systems include airbags, supports configured for deployment in unison with the airbags to provide anchors for the airbags, orient the airbags, and control a direction and speed of deployment of the airbags, and optional deployment mechanisms that can cause deployment of the airbags and the supports. During a vehicle event such as a collision, generally synchronous or near concurrent deployment of airbags and supports can provide more efficient operation and positioning of the airbags in relatively open areas of a vehicle cabin, such as when side panels, doors, roof panels, pillars, or other surfaces are not available to provide reaction surfaces or coupling locations for anchors or tethers.

Figure 1A:
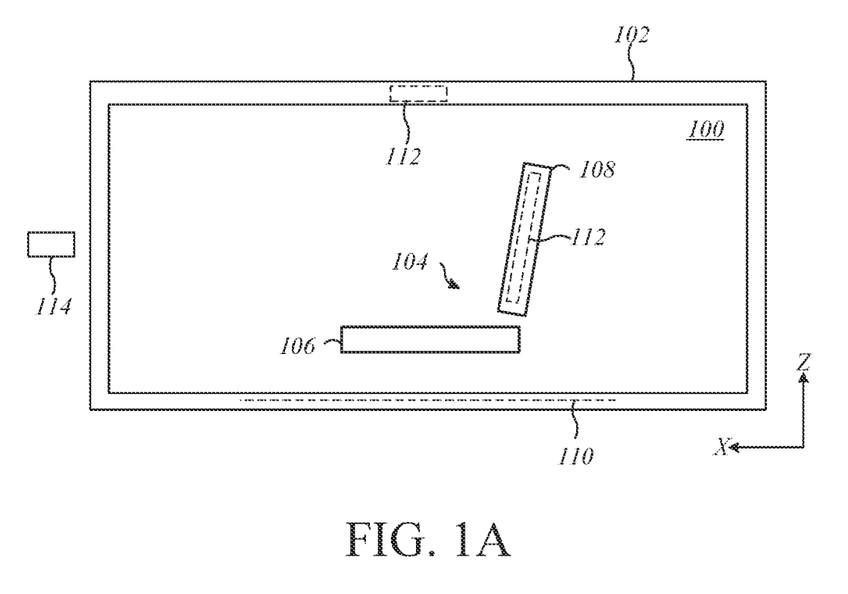
FIG. 1A is a schematic side view illustration of a vehicle cabin including an occupant safety system.
Figure 1B:
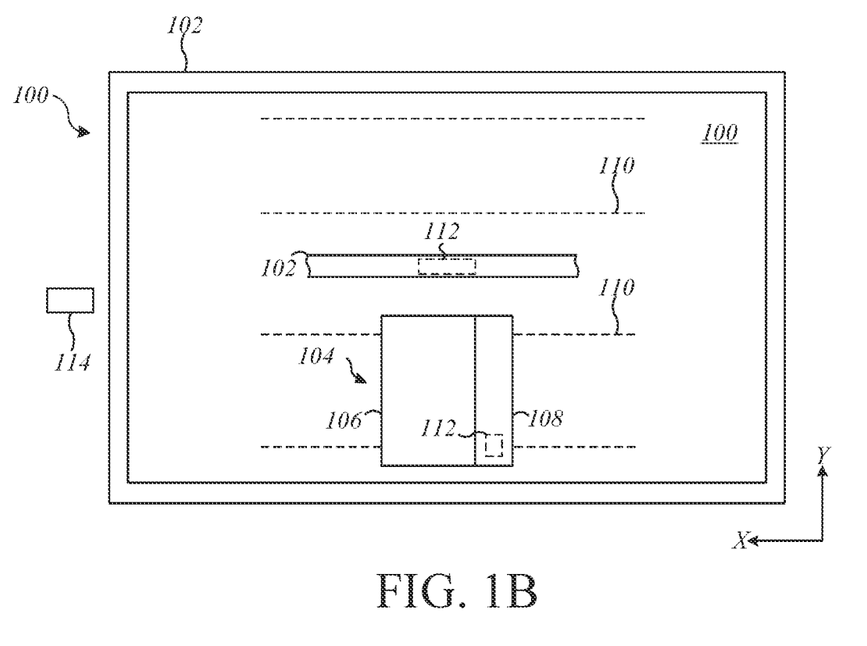
FIG. 1B is a schematic top view illustration of the vehicle cabin.

FIGS. 1A and 1B are a schematic side view and top view illustration of a vehicle cabin 100. The vehicle cabin 100 is defined within or is otherwise interior to body structures 102 and can be described in reference to a longitudinal or X direction (e.g., fore-aft), a lateral or Y direction (e.g., side to side), and an elevational or Z direction (e.g., up-down). The body structures 102 may include roof rails, pillars, a frame, body panels, interior panels, trim panels, and movable panels (e.g., doors, tailgate, hood, trunk lid, etc.) that are connected to other portions of the body structure 102 by mechanisms such as hinges or tracks.

The vehicle cabin 100 includes a seat system 104 having a seat pan 106 and a seat back 108. The seat pan 106 and the seat back 108 may include structures such as frames, springs, other suspension members, cushioning materials (e.g., foam or rubber), covers, and/or other structures suitable for use in seating an occupant within the vehicle cabin 100. The seat back 108 extends upward from the seat pan 106 and may be pivotally connected to the seat pan 106 to allow adjustment of a recline angle for the seat system 104. The seat system 104 can also include a restraint (not shown) for use in securing an occupant (not shown) to the seat pan 106 and the seat back 108.

The seat pan 106 and the seat back 108 are movable in respect to a seat guide 110. In this example, the seat guide 110 is shown using dotted lines extending in X direction within the vehicle cabin 100 to represent various positions possible for the seat system 104. The seat guide 110 can be configured to support fore-aft and side to side movement of the seat system 104 with a greater distance of travel when compared to conventional seat systems (not shown) to allow for various seating arrangements within the vehicle cabin 100. The seat guide 110 can control movement of the seat pan 106 and the seat back 108 using rails, tracks, electromagnets, or any other suitable mechanism. Because the seat system 104 is movable between various seating arrangements, passenger safety solutions require flexibility in implementation.

The vehicle cabin 100 includes an occupant safety system 112. The occupant safety system 112 is shown in dotted line to represent possible locations for storage of safety components (not shown) in a stowed position or a pre-deployment condition, though other or additional locations are possible. For example, the occupant safety system 112 may include airbags stowed behind various interior surfaces, such as within the body structures 102 or the seat back 108 as shown in FIGS. 1A and 1B. The occupant safety system 112 may also include housings, inflation mechanisms, deployment mechanisms, supports, etc. used in implementation of the occupant safety system 112 as further described herein.

Some components of the vehicle cabin 100 are in communication with a controller 114. For example, the controller 114 can be configured to prohibit, allow, or otherwise control movement of the seat system 104 along the seat guide 110. The controller 114 can be configured to prohibit, allow, or otherwise control components of the occupant safety system 112, such as controlling deployment of airbags or deployment of supports for airbags, for example, in response to receiving output signals from sensors (not shown) indicative of a vehicle event such as an imminent collision. The output signals from sensors can also include information indicative of orientation or position of the seat system 104 or an occupant in respect to the vehicle cabin 100.

Figure 2A:
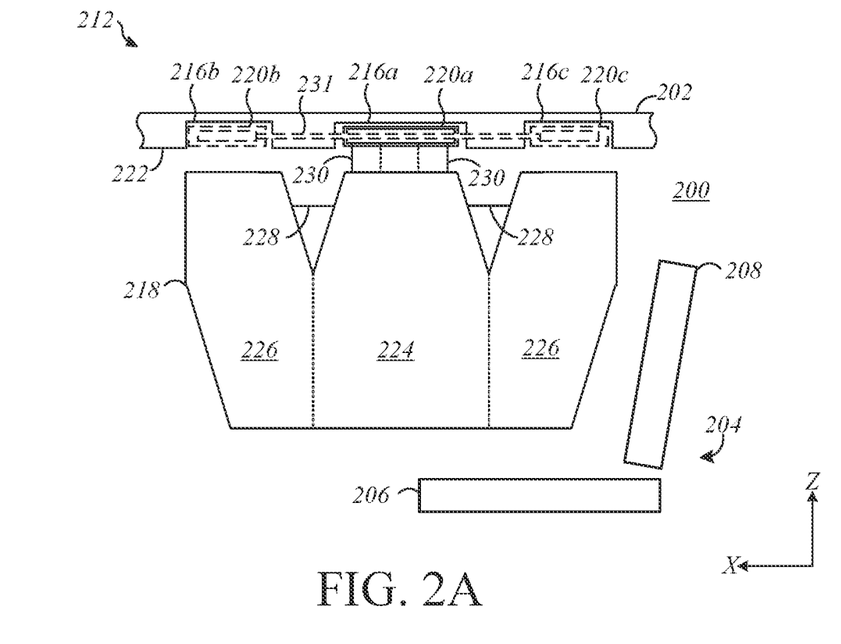
FIG. 2A is a schematic side view illustration of the vehicle cabin including a roof safety system in a deployed position.
Figure 2B:
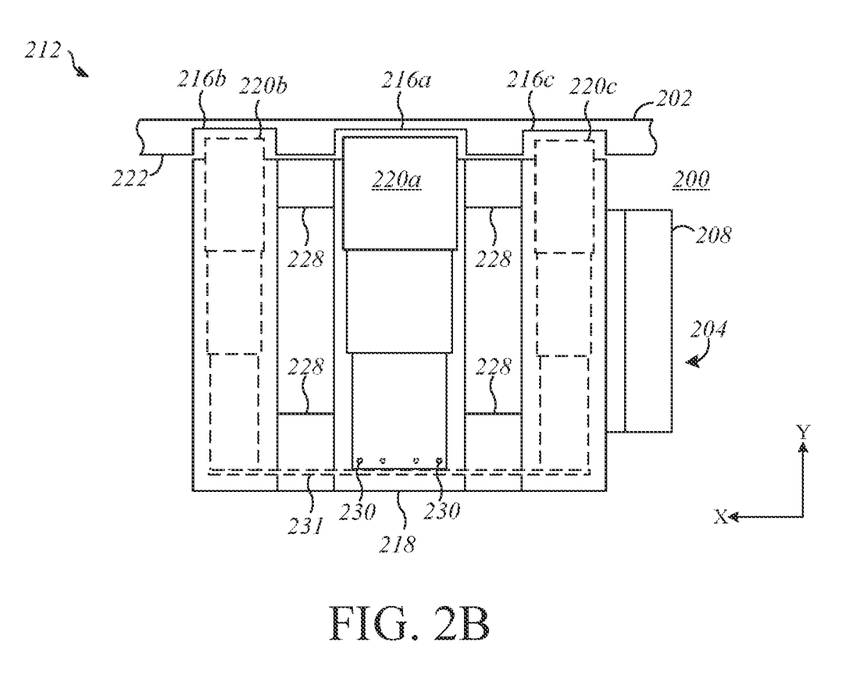
FIG. 2B is a schematic top view illustration of the vehicle cabin including the roof safety system in the deployed position.

FIGS. 2A and 2B are a schematic side view and top view illustration of a roof safety system 212 in a deployed position in a vehicle cabin 200. The roof safety system 212 includes housings 216a,b,c located within a body structure 202, an airbag 218 deployable from the housings 216a,b,c, and supports 220a,b,c including a central support 220a coupled to the airbag 218 and deployable from a central housing 216a in unison with the airbag 218. The body structure 202 can be a center roof spar extending in the X direction along the vehicle cabin 200 as shown. The housings 216a,b,c can be located behind an interior surface 222 of the vehicle cabin 200 that covers or conceals the body structure 202 and the housings 216a,b,c prior to deployment of the airbag 218 and the supports 220a,b,c. The housings 216a,b,c may be combined in a singular housing 216 (not shown) and may include packaging, inflation mechanisms, or deployment mechanisms (not shown) that support deployment of the airbag 218 and the supports 220a,b,c.

In the inflated or deployed position shown, the airbag 218 and the supports 220a,b,c extend laterally away from the interior surface 222 and the body structure 202 in the Y direction. The airbag 218 also extends elevationally downward in the Z direction toward a seat system 204 including a seat pan 206 and a seat back 208 in order to restrain motion of an occupant secured to the seat system 204 relative the vehicle cabin 200 (i.e. relative to the vehicle) during a vehicle event such as a collision. The seat system 204 is oriented in a similar manner within the vehicle cabin 200 as the seat system 104 is oriented within the vehicle cabin 100 of FIGS. 1A and 1B, though only a portion of the vehicle cabin 200 is shown to highlight the roof safety system 212.

The airbag 218 has a main chamber 224 and two reaction chambers 226. The main chamber 224 of the airbag 218 can be connected to the central housing 216a, and the reaction chambers 226 can be connected to the main chamber 224. The airbag 218 can be formed from flexible materials, porous materials, non-porous materials, internal baffles, internal tethers, external tethers, and other known elements. For examples, tethers 228 are shown extending between the main chamber 224 and the reaction chambers 226 of the airbag 218 to guide deployment and positioning of the reaction chambers 226 in respect to the main chamber 224 of the airbag 218. Guiding deployment can include orienting or positioning the reaction chambers 226 in respect to the main chamber 224 for improved performance of the airbag 218.

The central support 220a is coupled to the main chamber 224 of the airbag 218 via anchors 230. There are two anchors 230 shown at outmost corners of the main chamber 224 of the airbag 218 and the central support 220a, though additional anchors (e.g., such as anchors shown in dotted line between the anchors 230) may be present to secure the main chamber 224 of the airbag 218 to the central support 220a for deployment in unison. The central support 220a can guide the anchors 230 and the coupled main chamber 224 of the airbag 218 in traveling from a stowed position within the central housing 216a and proximate to the interior surface 222 of the vehicle cabin 200 to the deployed position spaced apart from the central housing 216a and the interior surface 222 in the Y direction as shown in FIG. 2B. The term "proximate" is used to indicate a position behind, adjacent to, or next to the interior surface 222. The term "spaced from" is used to indicate a position at a distance apart from the interior surface 222 such that movement of the anchors 230 from the stowed position to the deployed position involves travel of the anchors 230 over a predetermined distance such as over tens of centimeters, over one-half meter, or over one meter.

The anchors 230 may include tethers, fabric, stitching, or other materials or coupling mechanisms sufficient to secure the main chamber 224 of the airbag 218 in respect to the central support 220a. The central support 220a is configured to control a direction of deployment of the airbag 218 in respect to the interior surface 222 based on use of the central support 220a to position the anchors 230 which in turn position the main chamber 224 of the airbag 218 in respect to the interior surface 222. The anchors 230 that couple the main chamber 224 of the airbag 218 and the central support 220a allow the central support 220a to travel in unison with the main chamber 224 of the airbag 218 during deployment and position the entire airbag 218 in a predetermined location in respect to the interior surface 222.

The supports 220a,b,c shown in FIGS. 2A and 2B include the central support 220a and optional reaction supports 220b,c. The reaction supports 220b,c are coupled to the central support 220a using an optional reaction linkage 231 with the reaction supports 220b,c and the reaction linkage 231 shown in dotted lines to indicate the optional nature. The reaction supports 220b,c extend in the Y direction on opposite sides of the central support 220a. The reaction supports 220b,c are configured to travel from a stowed position within outer housings 216b,c and proximate to the interior surface 222 of the vehicle cabin 200 to a deployed position spaced apart from the outer housings 216b,c and the interior surface 222 in the Y direction as shown in FIG. 2B. The reaction supports 220b,c can be spaced from and coupled to the central support 220a with the reaction linkage 231 as shown such that motion of the central support 220a guides motion of the reaction supports 220b,c. In another example, the reaction supports 220b,c can be directly coupled to and extend from the central support 220a in the X direction (not shown) such that a singular, wider support 220 extends from a singular, wider housing 216 (not shown).

To support travel in unison, the supports 220a,b,c of FIGS. 2A and 2B are formed as telescoping panels configured to telescopically extend from the interior surface 222 during deployment of the airbag 218 in order to guide the anchors 230 to travel from the stowed position proximate or behind the interior surface 222 to the deployed position shown spaced apart from the interior surface 222. Though several sections of the telescoping panel are shown in FIG. 2B, the number of sections or portions can vary depending on packaging space or performance requirements. The central support 220a can be designed to withstand high loads (such as over 150 kg or over 200 kg) such that the central support 220a is configured to serve as a reaction surface for the main chamber 224 of the airbag 218. The optional reaction supports 220b,c can also be designed to withstand high loads such that the reaction supports 220b,c are configured to serve as reaction surfaces for the reaction chambers 226 of the airbag. For example, the reaction supports 220b,c can be deployed in cases when no other reaction surface is present to abut the reaction chambers 226 during a vehicle event, such as if the body structure 202 is used in an open-roofed vehicle such as a cabriolet. To serve as reaction surfaces, the supports 220a,b,c can be formed from relatively flat, panel-like telescoping structures as shown, can include pairs of extendable arms or rails with or without mesh, netting, stretchable materials, tethers, or other deformable and stowable materials extending between the arms or rails, or can be combinations of panels and rails in order to react loads experienced by the airbag 218 and maintain a position of the airbag 218 when deployed and loaded.

During a vehicle event, synchronous or near synchronous deployment of the airbag 218 and the supports 220a,b,c allows for efficient operation of the airbag 218 in relatively open areas of the vehicle cabin 200, such as when side panels, doors, roof panels, pillars, or other surfaces are not available to provide a reaction surface or a location for coupling an anchor or tether to the airbag 218. In one example, when the airbag 218 deploys, the anchors 230 coupling the central support 220a synchronously extend the supports 220a,b,c from the housings 216a,b,c, for example, in a passive manner based on physical coupling of the supports 220a,b,c by the reaction linkage 231 and without additional deployment mechanisms to orient the airbag 218 in respect to anticipated motion of the occupant. In another example, deployment mechanisms (not shown) such as a pyrotechnic device, an electromechanical device, a pneumatic device, a hydraulic device, and/or a pre-tensioned spring device can be controlled to deploy the supports 220a,b,c, such as when the interior surface 222 proximate the housings 216a,b,c is obstructed. In both examples, motion of the occupant relative to the vehicle cabin 200 is restrained by action of the anchors 230 providing tension between the central support 220a and the main chamber 224, the main chamber 224 of the airbag 218 abutting the reaction surface of the central support 220a while the occupant (not shown) abuts the reaction chamber 226 closest to the seat system 204 where the occupant is secured, and the reaction chamber 226 furthest from the seat system 204 abutting the reaction support 220b.

The interior surface 222 of the vehicle cabin 200 can be a trim panel, a headliner, a sunroof, a header, a side wall, or another surface supported by the body structure 202 or covering the body structure 202 and the housings 216a,b,c when the airbag 218 and the supports 220a,b,c are stowed. The interior surface 222 is shown as absent proximate to the housings 216a,b,c and may have opened, ruptured, partially broken away, detached, or otherwise moved away from the housings 216a,b,c before or during deployment of the airbag 218 and the supports 220a,b,c to allow the airbag 218 and the supports 220a,b,c to extend from the housings 216a,b,c and the interior surface 222 into the vehicle cabin 200 in unison. A deployment mechanism (not shown) such as a pyrotechnic device, an electromechanical device, a pneumatic device, a hydraulic device, and/or a pre-tensioned spring device can cause or enable a portion of the interior surface 222 to open, detach, or break away.

The roof safety system 212 can be an adaptive system (e.g., with a multi-stage or a multi-chamber airbag 218 as shown) to enable occupant contact with the airbag 218 to be optimally timed and to better control movement of the occupant. The vehicle cabin 200 can also include advanced sensors (not shown) to determine proper timing for the airbag 218 to deploy depending on various aspects such as severity, location, and speed of an imminent collision, occupant size, occupant mass, position of the seating system 204, restraint usage, etc.

The types of sensors employed can be varied and can communicate information a controller (not shown) similar to the controller 114 of FIGS. 1A and 1B. For example, the sensors can include sensors configured to capture information from an external environment outside of the vehicle cabin 200. External-sensing sensors can includes technologies such as radar, LIDAR, imaging, infrared, or other technologies configured to detect potential vehicle events such as collisions and provide information to the controller to allow a determination of timing of the vehicle event. The sensors can also include sensors internal to the vehicle cabin 200 such as weight sensors, buckle switch sensors, internal cameras, seat position sensors, imaging sensors, etc. that can provide information to the controller to allow determinations to be made for positioning of the seat system 204 and deployment timing and location for the roof safety system 212.

Figure 3A:
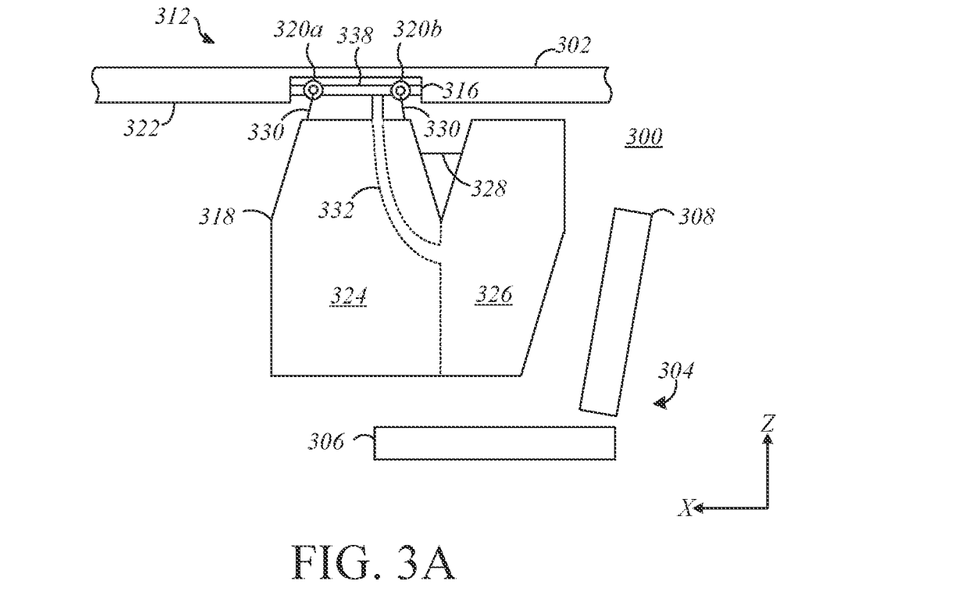
FIG. 3A is a schematic side view illustration of the vehicle cabin including an alternative roof safety system in a deployed position.
Figure 3B:
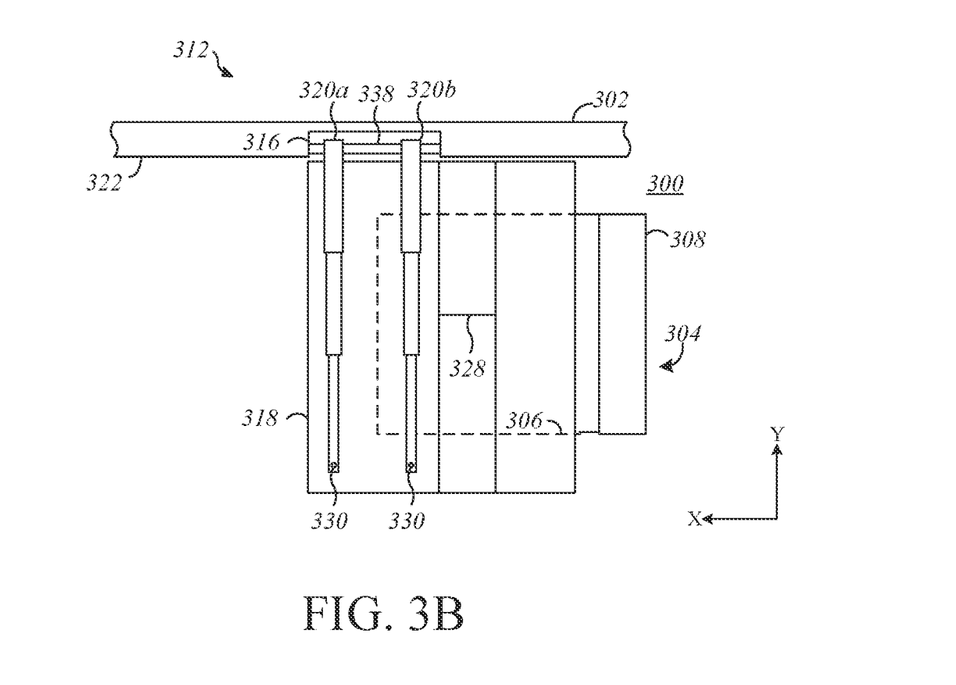
FIG. 3B is a schematic top view illustration of the vehicle cabin including the alternative roof safety system in the deployed position.

FIGS. 3A and 3B are a schematic side view and top view illustration of an alternative roof safety system 312 in a deployed position in a vehicle cabin 300. Many of the features of the roof safety system 312 are similar to the roof safety system 212 of FIGS. 2A and 2B, so only differences will be highlighted for brevity. The vehicle cabin 300 includes a seat system 304 with a seat pan 306 and a seat back 308 similar to the seat systems 104, 204 of FIGS. 1A to 2B. The vehicle cabin 300 includes a body structure 302 defining or supporting a housing 316 configured to be covered or concealed by an interior surface 322 of the vehicle cabin 300 prior to deployment of an airbag 318 and supports 320a,b. The supports 320a,b are coupled to the airbag 318 via anchors 330. The supports 320a,b and the anchors 330 are deployable from the housing 316 in unison with the airbag 318. The body structure 302 can be a center roof spar extending in the X direction along the vehicle cabin 300 as shown. The housing 316 may include packaging, inflation mechanisms, or deployment mechanisms (not shown) that support deployment of the airbag 318, the supports 320a,b, and the anchors 330.

The airbag 318 is shown with a main chamber 324 and an auxiliary chamber 326, though multiple auxiliary chambers (not shown), such as on both sides of the main chamber 324 are possible. The main chamber 324 of the airbag 318 can be connected to the housing 316, and the auxiliary chamber 326 can be connected to the main chamber 324. The main chamber 324 can be sealed relative to the auxiliary chamber 326 such that different pressure levels can be achieved in the main chamber 324 and the auxiliary chamber 326. The main chamber 324 and the auxiliary chamber 326 can also be deployed using separate inflation mechanisms. In one example, an inflation mechanism 332 for the auxiliary chamber 326 can be sealed from and pass through the main chamber 324 to reach the auxiliary chamber 326. For example, the inflation mechanism 332 can include a silicon-covered fabric hose or tube (shown in dotted line) that extends through the main chamber 324 without inflating the main chamber 324 in order to fluidly communicate only with the auxiliary chamber 326 and inflate the auxiliary chamber 326 to a predetermined pressure level, for example, a pressure level that differs from a pressure level of the main chamber 324.

A tether 328 is shown extending between the main chamber 324 and the auxiliary chamber 326 of the airbag 318 in FIG. 3A. The tether 328 is configured to guide or otherwise orient deployment and positioning of the auxiliary chamber 326 in respect to the main chamber 324 of the airbag 318. The tether 328 can also support proper positioning of the inflation mechanism 332 that extends through the main chamber 324 to the auxiliary chamber 326. The airbag 318 can be formed from flexible materials, porous materials, non-porous materials, internal baffles, internal tethers, external tethers, and other known elements.

The main chamber 324 can be deployed to prohibit loose objects from impacting an occupant secured in the seat system 304, for example, when the seat system 304 is positioned in an open vehicle cabin without traditional rows of seats. The auxiliary chamber 326 can be configured to absorb occupant energy during a vehicle event in conjunction with the main chamber 324. A pressure in the auxiliary chamber 326 can be less than a pressure of the main chamber 324, such as half in value, and the main chamber 324 can serve as a reaction surface for the auxiliary chamber 326. The main chamber 324 and the auxiliary chamber 326 can be selectively deployed. For example, the main chamber 324 can be deployed to prohibit loose objects while the auxiliary chamber 326 is not deployed (not shown). In another example, if a safety seat (not shown) is anchored to the seat system 304, the main chamber 324 can be deployed prior to or during a vehicle event while the auxiliary chamber 326 can be prohibited from deployment to avoid interaction with the safety seat. In another example, deployment of the main chamber 324 can be timed before deployment of the auxiliary chamber 326, such as in situations with multiple vehicle events. In another example, deployment of the auxiliary chamber 326 can be timed before deployment of the main chamber 324.

The supports 320a,b are formed as a pair of rails or rods configured to translate or telescopically extend from the interior surface 322 to guide the respective anchors 330 in traveling from a stowed position within the housing 316 and concealed or covered by the interior surface 322 to the deployed position spaced from the housing 316 and the interior surface 322 as shown in FIGS. 3A and 3B. The supports 320a,b can be configured to rotate about a pivot 338 prior to extension to as part of the designed travel from the stowed position to the deployed position. When the supports 320a,b are designed to both rotate about the pivot 338 and translate or extend telescopically as shown, packaging space for the roof safety system 312 can be reduced. Operation of the roof safety system 312, such as deployment of the airbag 318, the supports 320a,b, and the anchors 330 is similar to operation of the roof safety system 212 of FIGS. 2A to 2B.

Figure 4:
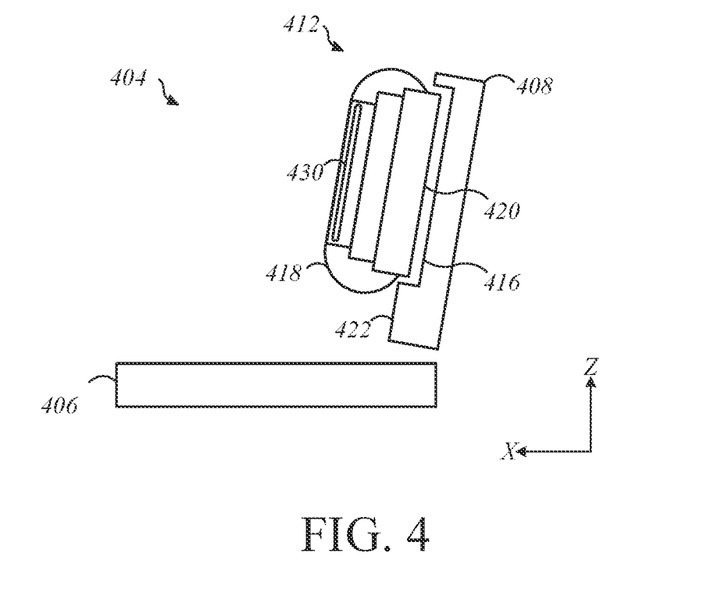
FIG. 4 is a schematic side view illustration of a seat safety system in a deployed position.

FIG. 4 is a schematic side view illustration of a seat safety system 412 in a deployed position. The seat safety system 412 is part of a seat system 404 and can be used separately from or in conjunction with the roof safety systems 212, 312 of FIGS. 2A to 3B as part of a comprehensive occupant safety system such as the occupant safety system 112 of FIGS. 1A to 1B. The seat system 404 includes a seat pan 406 and a seat back 408 and is configured to be movable within a vehicle cabin (not shown) such as the vehicle cabins 100, 200, 300. The seat system 404 is similar to the seat systems 104, 204, 304 of FIGS. 1A to 3B, so only differences will be described for brevity.

The seat system 404 includes a housing 416 defined within the seat back 408. The housing 416 is configured to support and stow components of the seat safety system 412. The seat safety system 412 includes an airbag 418 configured to deploy from the housing 416, for example, in response to an output signal indicative of a vehicle event such as an imminent collision. The seat safety system 412 also includes a support 420 configured to deploy from the housing 416 in unison with deployment of the airbag 418. The housing 416, the airbag 418, and the support 420 are configured to be covered or concealed by a seat surface 422 of the seat back 408 in a stowed condition prior to deployment. The seat surface 422 can be a trim cover, a cushion cover, a panel, an armrest, etc. The term interior surface can be used interchangeably with the term seat surface 422. The housing 416 may also include or support packaging, inflation mechanisms, or deployment mechanisms (not shown) to aid deployment of the airbag 418 and the support 420.

The support 420 is coupled to the airbag 418 via an anchor 430. The anchor 430 is shown as extending elevationally in the Z direction between an outer edge of the support 420 and an outer edge of the airbag 418 in the deployed position. The anchor 430 can be formed from a flexible panel, a stitch line, or other means of coupling between the airbag 418 and the support 420. The support 420 can guide the anchor 430 and the coupled airbag 418 in traveling from a stowed position within the housing 416 and proximate to the seat surface 422 to the deployed position spaced apart from the housing 416 and the seat surface 422 in the X direction as shown in FIG. 4. The anchor 430 that couples the airbag 418 and the support 420 allows the support 420 to travel in unison with the airbag 418 in a passive manner during deployment of the airbag 418.

The support 420 in FIG. 4 is formed as a telescoping panel configured to telescopically extend from the seat surface 422 during deployment of the airbag 418 in order to guide the anchor 430 to travel from the stowed position proximate or behind the seat surface 422 to the deployed position shown spaced apart from the seat surface 422. The support 420 can serve as a reaction surface for the airbag 418, for example, if an occupant (not shown) secured in the seat system 404 experiences motion in the Y direction into or out of a plane of the representation in FIG. 4. The number of sections or portions of the telescoping panel of the support 420 can vary depending on packaging space, size of the airbag 418, or other performance requirements for the seat safety system 412. Since the seat system 404 is movable to various locations and position of the occupant in the seat system 404 in respect to conventionally packaged airbags can vary, an integrated seat safety system 412 with its own airbag 418, anchor 430, and reaction surface in the form of the support 420 can improve overall safety for the occupant when compared to conventional safety systems that rely on fixed positioning between an occupant and the vehicle.

Figure 5:
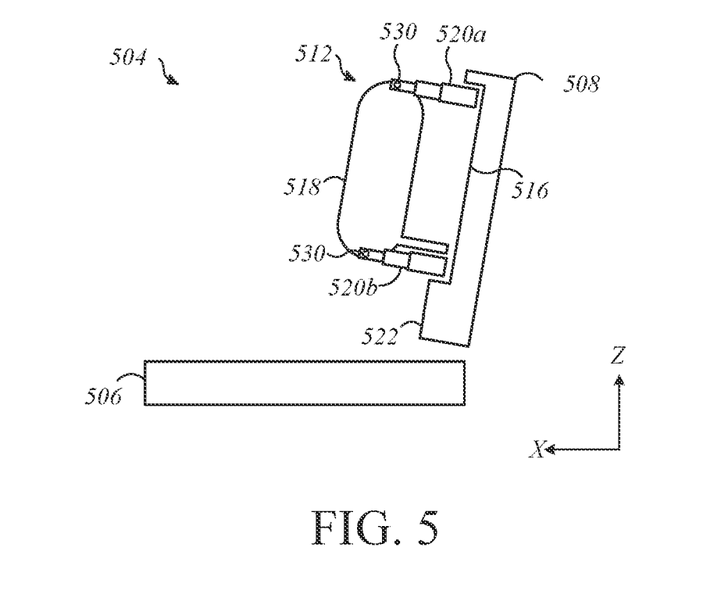
FIG. 5 is a schematic side view illustration of an alternative seat safety system in a deployed position.

FIG. 5 is a schematic side view illustration of an alternative seat safety system 512 in a deployed position. The seat safety system 512 is part of a seat system 504 and can be used separately from or in conjunction with the roof safety systems 212, 312 of FIGS. 2A to 3B as part of a comprehensive occupant safety system such as the occupant safety system 112 of FIGS. 1A to 1B. The seat system 504 includes a seat pan 506 and a seat back 508 and is configured to be movable within a vehicle cabin (not shown) such as the vehicle cabins 100, 200, 300. The seat system 504 is similar to the seat systems 104, 204, 304, 404 of FIGS. 1A to 4, so only differences will be described for brevity.

The seat system 504 includes a housing 516 defined within the seat back 508. The housing 516 is configured to support and stow components of the seat safety system 512. The seat safety system 512 includes an airbag 518 configured to deploy from the housing 516, for example, in response to an output signal indicative of a vehicle event such as an imminent collision. The seat safety system 512 also includes rails 520*a,b* configured to deploy from the housing 516 in unison with deployment of the airbag 518. The housing 516, the airbag 518, and the rails 520*a,b* are configured to be covered or concealed by a seat surface 522 of the seat back 508 in a stowed condition prior to deployment. A portion of the seat surface 522 can be configured to break way or detach during deployment of the airbag 518 and the rails 520*a,b*. The housing 516 may also include or support packaging, inflation mechanisms, or deployment mechanisms (not shown) to aid deployment of the airbag 518 and the rails 520*a,b*.

The rails 520*a,b* are coupled to the airbag 518 by way of corresponding anchors 530. The anchors 530 can be formed from tethers, grommets, stitches, or other means of coupling between the airbag 518 and the rails 520*a,b*. The rails 520*a,b* can guide the corresponding anchors 530 and the coupled airbag 518 in traveling from a stowed position within the housing 516 and proximate to the seat surface 522 to the deployed position spaced apart from the housing 516 and the seat surface 522 in the X direction as shown in FIG. 5, for example, through including telescoping portions or translatable portions traveling on guides. The anchors 530 and the rails 520*a,b* can travel in unison with the airbag 518 in a passive manner during deployment of the airbag 518.

The rails 520*a,b* can be configured to control deployment direction of the airbag 518 such that the airbag 518 is located on a side of an occupant, in front of an occupant, or on both sides and in front of an occupant secured to the seat system 504. In other words, use of the rails 520*a,b* to position the anchors 530 allows for proper placement of the airbag 518 in respect to the occupant without reliance on structures outside of the seat system 504. Use of an integrated seat safety system 512 that includes the airbag 518, the rails 520*a,b*, and the anchors 530 can improve overall safety for the occupant when compared to conventional safety systems that rely on fixed positioning between an occupant and the vehicle.

Figure 6:
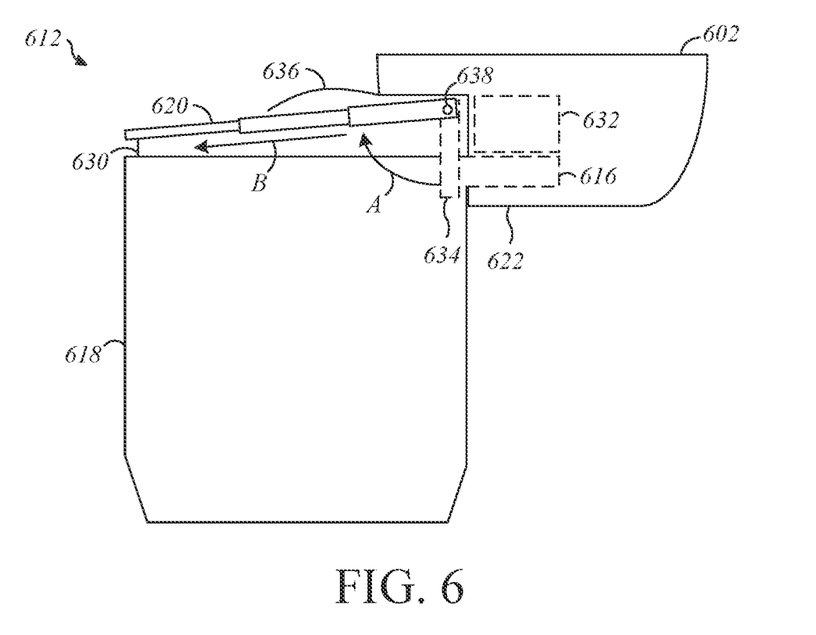
FIG. 6 is a schematic illustration of an occupant safety system including a deployment mechanism.

FIG. 6 is a schematic illustration of an occupant safety system 612 including a deployment mechanism 632. The occupant safety system 612 and the deployment mechanism 632 are supported by a body structure 602 and packaged behind an interior surface 622 prior to deployment. The body structure 602 can be a roof spar, a roof rail, a pillar, a frame, a body panel, an interior panel, a door, a tailgate, a portion of a seat, or another structure within a vehicle cabin similar to the vehicle cabins 100, 200, 300 of FIGS. 1A to 3B and is shown without reference to vehicle direction as the occupant safety system 612 can be implemented in a variety of orientations in respect an occupant depending on a location of the body structure 602. The interior surface 622 can cover the occupant safety system 612 and the body structure 602 when the occupant safety system 612 is in a stowed position with components of the occupant safety system 612 in a non-deployed condition. The interior surface 622 can include a trim panel, a headliner, a sunroof, a header, a side wall, or another surface supported by or covering the body structure 602.

The occupant safety system 612 includes a housing 616, an airbag 618 deployable from the housing 616, a support 620 deployable from the interior surface 622 and configured to direct deployment of the airbag 618, an anchor 630 coupling the airbag 618 to the support 620, and the deployment mechanism 632 configured to cause deployment of the airbag 618, the support 620, or both the airbag 618 and the support 620. The airbag 618 is shown as having a single chamber, though various shapes and sizes are possible for the airbag 618, for example, the airbag 618 can be similar to any of the airbags 218, 318, 418, 518 shown in FIGS. 2A to 5.

The support 620 in FIG. 6 includes a door 634 that covers the airbag 618 in the housing 616 behind a breakaway portion 636 of the interior surface 622 when the airbag 618 and the support 620 are in a stowed position, that is, the indicated portion 636 of the interior surface 622 is configured to break away from a remainder of the interior surface 622. The door 634 is configured to rotate about a pivot 638 from the dotted line position shown in order to guide the anchor 630 to travel from the stowed position to the deployed position as indicated by the arrows A and B in FIG. 6. The door 634 can include a telescoping panel such that the door 634 first rotates as indicated by the arrow A then telescopically extends as indicated by the arrow B so that the anchor 630 reaches the deployed position after the door 634 rotates about the pivot 638. In the example of FIG. 6, the support 620 includes the door 634 and the anchor 630.

The deployment mechanism 632 can cause the door 634 to rotate, for example, if deployment of the airbag 618 is insufficient to rotate the door 634 about the pivot 638 or if the breakaway portion 636 of the interior surface 622 is blocked by an obstruction (not shown). The deployment mechanism 632 can also or alternatively be used to deploy the airbag 618, which in turn can cause the door 634 to rotate about the pivot 638 and the breakaway portion 636 to open, detach, or breakaway. Once the breakaway portion 636 is cleared, the airbag 618 can extend in unison with the support 620 based on the direct connection of the anchor 630 between the airbag and the support 620.

Various types of deployment mechanisms can be used to effect motion of the airbag 618 and the support 620. For example, the deployment mechanism 632 may be configured as one or more of a pyrotechnic device, an electromechanical device, a pneumatic device, a hydraulic device, and/or a pre-tensioned spring device configured to cause or enable the breakaway portion 636 to open, detach, or break away from the remainder of the interior surface 622. For example, an electromechanical device can include an electric motor, a threaded rod, and a threaded guide coupled to a sensor module (not shown) to receive commands from a controller such as the controller 114 of FIGS. 1A and 1B. A pneumatic device can include pressurized gas (or a vacuum) configured to effect movement of a piston (not shown) based on a command from the controller. A pre-tensioned spring device can include a spring that is coupled to a sensor module (not shown). The spring can be held in tension until being selectively released, for example, based on a command from the controller.

The breakaway portion 636 of the interior surface 622 is shown as partially broken away from and rotated away from the housing 616 and the support 620 in FIG. 6. The breakaway portion 636 can be displaced prior to deployment of the airbag 618 using the deployment mechanism 632 when, for example, an obstruction warrants pre-deployment intervention. The breakaway portion 636 can also be displaced passively during deployment of the airbag 618 and the support 620. The breakaway portion 636 is shown as captured above the support 620 and can serve as an additional reaction surface for the airbag 618 or a cushion between the support 620 and another structure (not shown) within the vehicle during a vehicle event such as a collision.

The door 634 and the pivot 638, the telescoping nature of the overall support 620, the breakaway portion 636 cushioning, and the as-needed nature of the deployment mechanism 632 provide for an improved occupant safety system 612. The occupant safety system 612 of FIG. 6 requires a small amount of packaging space, is adaptable to various vehicle events, and is suitable for installation in a variety of locations within a vehicle cabin that may not have access to a fixed-position anchor.

Figure 7:
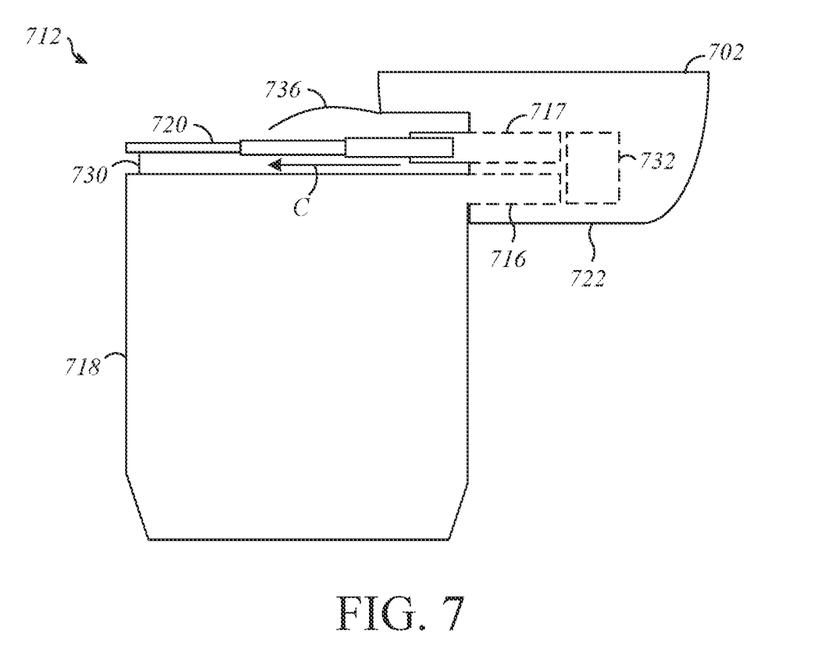
FIG. 7 is a schematic illustration of an occupant safety system including an alternative deployment mechanism.

FIG. 7 is a schematic illustration of an occupant safety system 712 including a deployment mechanism 732. The occupant safety system 712 and the deployment mechanism 732 are supported by a body structure 702 and packaged behind an interior surface 722 prior to deployment. The body structure 702 can be a roof spar, a roof rail, a pillar, a frame, a body panel, an interior panel, a door, a tailgate, a portion of a seat, or another structure within a vehicle cabin similar to the vehicle cabins 100, 200, 300 of FIGS. 1A to 3B and is shown without reference to vehicle direction as the occupant safety system 712 can be implemented in a variety of orientations in respect an occupant depending on a location of the body structure 702. The interior surface 722 can cover the occupant safety system 712 and the body structure 702 when the occupant safety system 712 is in a stowed position. The interior surface 722 can include a trim panel, a headliner, a sunroof, a header, a side wall, or another surface supported by or covering the body structure 702.

The occupant safety system 712 includes a pair of housings 716, 717, an airbag 718 deployable from the housing 716, a support 720 deployable from the housing 717 and configured to direct deployment of the airbag 718, an anchor 730 coupling the airbag 718 to the support 720, and the deployment mechanism 732 configured to cause deployment of the airbag 718 from the housing 716, deployment of the support 720 from the housing 717, or deployment of both the airbag 718 and the support 720 from the respective housings 716, 717. The airbag 718 is shown as having a single chamber, though various shapes and sizes are possible for the airbag 718, for example, the airbag 718 can be similar to any of the airbags 218, 318, 418, 518, 618 shown in FIGS. 2A to 6.

The support 720 in FIG. 7 can be configured both to translate and to telescopically extend as indicated by the arrow C, for example, by sliding along a guide rail (not shown) in the housing 717 and extending using a series of telescoping panels or rods as shown. The support 720 translates and extends from the housing 717 so that the anchor 730 reaches the fully deployed position shown in FIG. 7. The support 720 and the anchor 730 can be configured to lock in the deployed position after translation and extension from the stowed position so that the support 720 is configured to serve as a reaction surface for the airbag 718 in addition to controlling a direction of deployment of the airbag 718.

The deployment mechanism 732 can be used to deploy the support 720 from the housing 717 to cause a breakaway portion 736 of the interior surface 722 to move away from a remainder of the interior surface 722, for example, if deployment of the airbag 718 is blocked by an obstruction (not shown). Once the breakaway portion 736 is cleared, the airbag 718 can extend in unison with the support 720 based on the direct connection of the anchor 730 between the airbag and the support 720. The deployment mechanism 732 can also be used to deploy the airbag 718 from the housing 716, causing the breakaway portion 736 to fracture, crack, or otherwise separate and move away from a remainder of the interior surface 722, passively pulling the anchor 730 and coupled support 720 to translate and extend from the housing 717. The breakaway portion 736 can be captured between the support 720 and other structures (not shown) in the vehicle, providing cushioning or additional support during a vehicle event such as a collision.

Various types of deployment mechanisms can be used to effect motion of the airbag 718 and the support 720. For example, the deployment mechanism 732 may be configured as one or more of a pyrotechnic device, an electromechanical device, a pneumatic device, a hydraulic device, and/or a pre-tensioned spring device configured to cause or enable the breakaway portion 736 to open, detach, or break away from the remainder of the interior surface 722. For example, an electromechanical device can include an electric motor, a threaded rod, and a threaded guide coupled to a sensor module (not shown) to receive commands from a controller such as the controller 114 of FIGS. 1A and 1B. A pneumatic device can include pressurized gas (or a vacuum) configured to effect movement of a piston (not shown) based on a command from the controller. A pre-tensioned spring device can include a spring that is coupled to a sensor module (not shown). The spring can be held in tension until being selectively released, for example, based on a command from the controller.

The translatable and telescoping nature of the support 720, the breakaway portion 736 cushioning, and the as-needed nature of the deployment mechanism 732 provide for an improved occupant safety system 712. The occupant safety system 712 of FIG. 7 requires additional packaging space when compared to the occupant safety system 612 of FIG. 6, but the overall amount of packaging space is small, thus the occupant safety system 712 is adaptable to various vehicle events and is suitable for installation in a variety of locations within a vehicle cabin.

Figure 8:
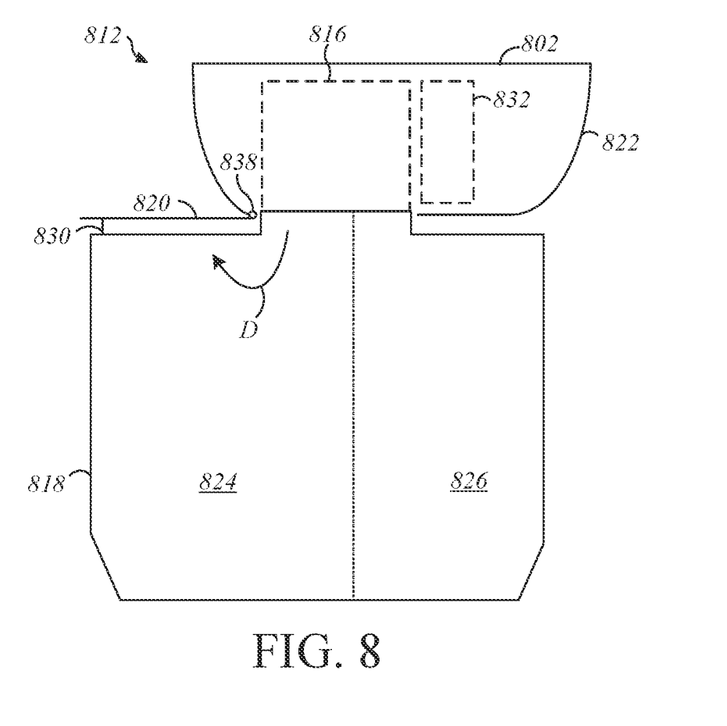
FIG. 8 is a schematic illustration of an occupant safety system including an alternative deployment mechanism.

FIG. 8 is a schematic illustration of an occupant safety system 812 including a deployment mechanism 832. The occupant safety system 812 and the deployment mechanism 832 are supported by a body structure 802 and packaged behind an interior surface 822 prior to deployment. The body structure 802 can be a roof spar, a roof rail, a pillar, a frame, a body panel, an interior panel, a door, a tailgate, a portion of a seat, or another structure within a vehicle cabin similar to the vehicle cabins 100, 200, 300 of FIGS. 1A to 3B and is shown without reference to vehicle direction as the occupant safety system 812 can be implemented in a variety of orientations in respect an occupant depending on a location of the body structure 802. The interior surface 822 can cover the occupant safety system 812 and the body structure 802 when the occupant safety system 812 is in a stowed position. The interior surface 822 can include a trim panel, a headliner, a sunroof, a header, a side wall, or another surface supported by or covering the body structure 802.

The occupant safety system 812 includes a housing 816, an airbag 818 deployable from the housing 816, a support 820 deployable from the interior surface 822 and configured to direct deployment of the airbag 818, an anchor 830 coupling the airbag 818 to the support 820, and the deployment mechanism 832 configured to cause deployment of the airbag 818 from the housing 816.

The airbag 818 is shown with a main chamber 824 and an auxiliary chamber 826. The main chamber 824 of the airbag 818 can be designed to receive gas flow from the deployment mechanism 832 before the auxiliary chamber 826 or to receive a higher percentage of gas flow as compared to the auxiliary chamber 826 to ensure faster deployment of the support 820 and promote proper positioning of the airbag 818 in respect to the support 820 and the remainder of the interior surface 822. The airbag 318 can be formed from flexible materials, porous materials, non-porous materials, internal baffles, internal tethers, external tethers, and other known elements and can be similar to the airbags 218, 318, 418, 518, 618, 718 of FIGS. 2 to 7.

The support 820 can be formed from a portion of the interior surface 822 that covers the airbag 818 in the housing 816 behind the interior surface 822 when the airbag 818 and the support 820 are in a stowed position (not shown). The support 820 in FIG. 8 can be configured to rotate about a pivot 838 in a direction indicated by the arrow D, first outward or generally away from the housing 816 and the interior surface 822 before turning back toward the housing 816 and the interior surface 822 until the support 820 reaches a predetermined position. The predetermined position of the support 820 can be, for example, a deployed position where the support 820 extends generally in a common plane with a lower portion of a remainder of the interior surface 822 as shown in FIG. 8. The support 820 can serve as a reaction surface for the main chamber 824 of the airbag 818. A remainder of the interior surface 822, that is, the portion of the interior surface 822 that is not formed by the support 820, can serve as a reaction surface for the auxiliary chamber 826 of the airbag 818 as shown.

Deployment of the airbag 818 can cause deployment of the support 820 such that the support 820 rotates away out and away from the interior surface 822 in the direction indicated by the arrow D. The anchor 830 is coupled the support 820 and moves with the support 820 during rotation of the support 820. The anchor 830 is also coupled to the airbag 818 such that the anchor 830 controls movement of the airbag 818 to the deployed position shown in FIG. 8. The support 820 can be configured to lock in the deployed position in respect to the pivot 838 after the support 820 rotates from the stowed position to the deployed position so that the support 820 is configured to act as a reaction surface for the main chamber 824 of the airbag 818. The support 820 can be locked, for example, by using a stopping mechanism to halt rotation, a hinge with a fixed rotational angle, a ratcheting mechanism, or any another mechanism configured to hold the support 820 to serve as the reaction surface. Though a single anchor 830 is shown in FIG. 8, multiple anchors (not shown) can couple the airbag 818 and the support 820.

The deployment mechanism 832 can be used to deploy the airbag 818 from the housing 816, with deployment of the airbag 818 causing the support 820 to rotate away from a remainder of the interior surface 822, passively carrying the anchor 830 and positioning the airbag 818 in respect to the support 820 based on the anchor 830 coupling the airbag 818 and the support 820. The deployment mechanism 832 can also be configured to cause the support 820 to break away from the remainder of the interior surface 822 and to start rotation about the pivot 838, for example, if deployment of the airbag 818 and rotation of the support 820 is blocked by an obstruction (not shown).

Various types of deployment mechanisms can be used to effect motion of the airbag 818 and the support 820. For example, the deployment mechanism 832 may be configured as one or more of a pyrotechnic device, an electromechanical device, a pneumatic device, a hydraulic device, and/or a pre-tensioned spring device configured to cause or enable the support 820 to open, detach, break away, or rotate away from the remainder of the interior surface 822. For example, an electromechanical device can include an electric motor, a threaded rod, and a threaded guide coupled to a sensor module (not shown) to receive commands from a controller such as the controller 114 of FIGS. 1A and 1B. A pneumatic device can include pressurized gas (or a vacuum) configured to effect movement of a piston (not shown) based on a command from the controller. A pre-tensioned spring device can include a spring that is coupled to a sensor module (not shown). The spring can be held in tension until being selectively released, for example, based on a command from the controller.

The rotatable nature of the support 820 the forms a portion of the interior surface 822, the physical coupling between the support 820 and the airbag 818 using the anchor 830, and the as-needed nature of the deployment mechanism 832 provide for an improved occupant safety system 812 that is adaptable to various vehicle events and is suitable for installation in a variety of locations within a vehicle cabin.

Figure 9:
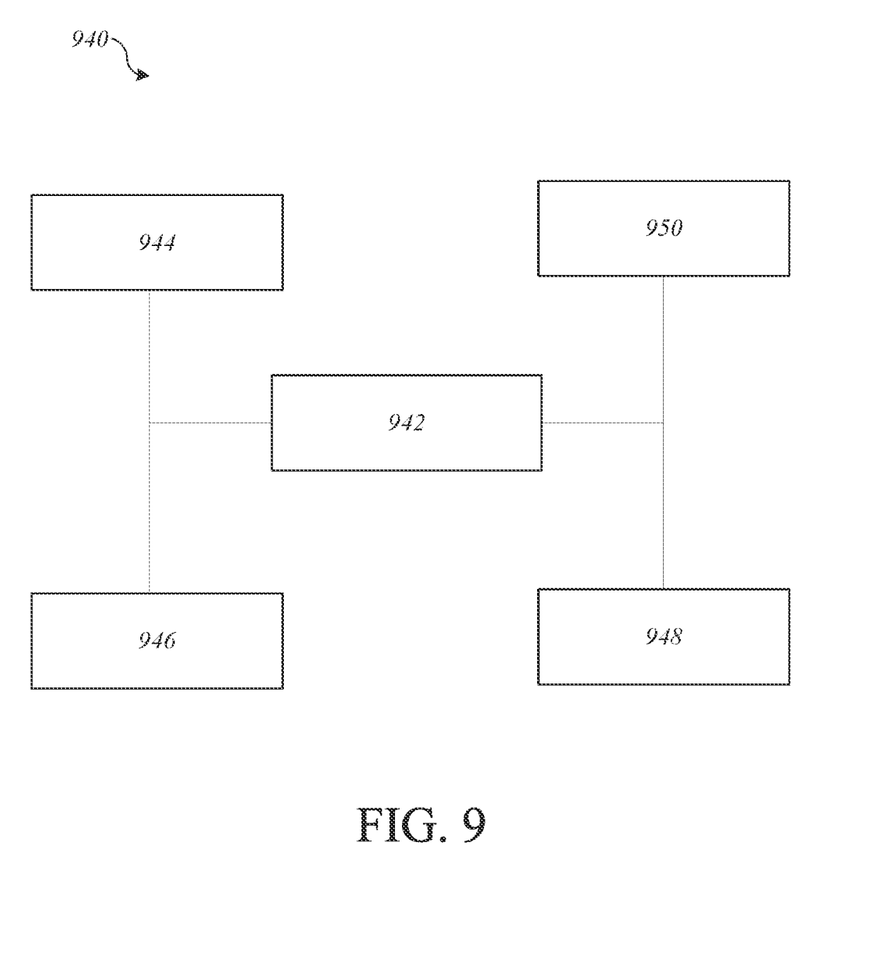
FIG. 9 is a block diagram of an occupant safety system.

FIG. 9 is a block diagram that shows a safety system 940. The safety system 940 can include a controller 942, sensors 944, a deployment mechanism 946, an airbag 948, and a support 950. The safety system 940 can include components similar to components described in reference to the safety systems 112, 212, 312, 412, 512, 612, 712, 812 of FIGS. 1A to 8. The deployment mechanism 946 can operate in a manner similar to the deployment mechanisms 632, 732, 832 described in reference to FIGS. 6 to 8. The airbag 948 can operate in a manner similar to the airbags 218, 318, 418, 518, 618, 718, 818 described in reference to FIGS. 2A to 8. The support 950 can operate in a manner similar to the supports 220a,b,c, 320a,b, 420, 620, 720, 820 and the rails 520a,b described in reference to FIGS. 2A to 8. The safety system 940 is shown as including the deployment mechanism 946, the airbag 948, and the support 950, but one or more of these components may be absent from the safety system 940.

The controller 942 coordinates operation of the safety system 940 by communicating electronically (e.g., using wired or wireless communications) with the sensors 944, the deployment mechanism 946, the airbag 948, and the support 950. The controller 942 may receive information (e.g., signals, information, and/or data) from the sensors 944 and may receive information from and/or send information to other portions of the safety system 940 such as the deployment mechanism 946, the airbag 948, the support 950, or other portions (not shown).

The sensors 944 may capture or receive information related, for example, to components of the safety system 940 and from an external environment where the safety system 940 is located. The external environment can be an exterior of a vehicle or an interior of a vehicle such as the vehicle cabins 100, 200, 300 of FIGS. 1A to 3C. Information captured or received by the sensors 944 can relate to seats, occupants, operation of other vehicles, pedestrians and/or objects in the external environment, operating conditions of the vehicle, operating conditions or trajectories of other vehicles, and/or other conditions within the vehicle or exterior to the vehicle.

The safety system 940 can change an operational mode of the deployment mechanism 946, the airbag 948, and/or the support 950 based on a control signal, such as a signal from the controller 942. The control signal may be based on information captured or received by the sensors 944 and may cause various components within the safety system 940 to change between various operational modes, such as between stowed positions and deployed positions.

Figure 10:
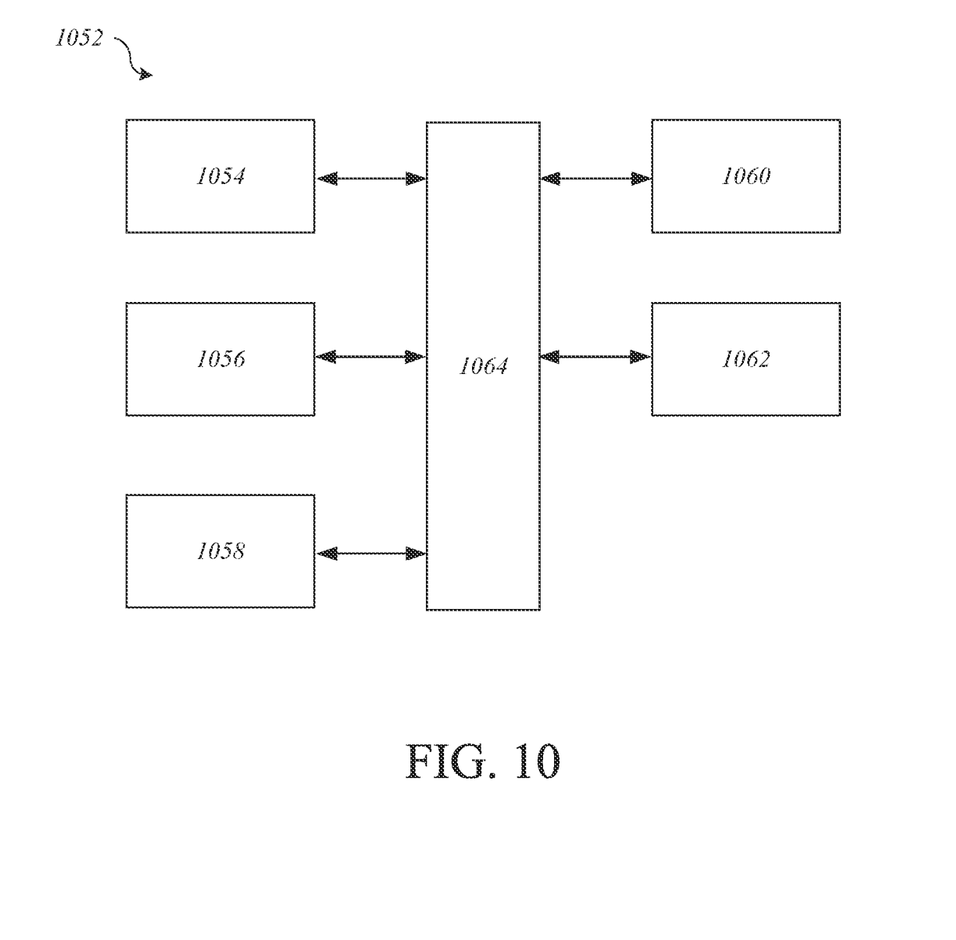
FIG. 10 is an illustration of a hardware configuration for a controller.

FIG. 10 shows an example of a hardware configuration for a controller 1052 that may be used to implement the controller 942 and/or other portions of the safety system 940. In the illustrated example, the controller 1052 includes a processor 1054, a memory device 1056, a storage device 1058, one or more input devices 1060, and one or more output devices 1062. These components may be interconnected by hardware such as a bus 1064 that allows communication between the components.

The processor 1054 may be a conventional device such as a central processing unit and is operable to execute computer program instructions and perform operations described by the computer program instructions. The memory device 1056 may be a volatile, high-speed, short-term information storage device such as a random-access memory module. The storage device 1058 may be a non-volatile information storage device such as a hard drive or a solid-state drive. The input devices 1060 may include sensors such as the sensors 944 and/or any type of human-machine interface, such as buttons, switches, a keyboard, a mouse, a touchscreen input device, a gestural input device, or an audio input device. The output devices 1062 may include any type of device operable to send commands associated with an operating mode or state or provide an indication to a user regarding an operating mode or state, such as a display screen, an interface for a safety system such as the safety system 940, or an audio output.

As described above, one aspect of the present technology is the gathering and use of data available from various sources, such as from the sensors 944 or user profiles, to improve the function of safety systems such as the safety systems 112, 212, 312, 412, 512, 612, 712, 812, 940. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and exercise information), date of birth, or any other identifying or personal information.

The present disclosure recognizes that the use of personal information data, in the present technology, can be used to the benefit of users. For example, the personal information data can be used to deliver changes to operational modes of safety systems such as the safety systems 112, 212, 312, 412, 512, 612, 712, 812, 940 to best match user preferences or profiles. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes in safety systems can be implemented for a given user by inferring user preferences or user status based on non-personal information data, a bare minimum amount of personal information, other non-personal information available to the system, or publicly available information.

What is claimed is:

1. A seat, comprising:
   a seat back;
   a housing defined within the seat back;
   an airbag and a support having a stowed position disposed within the housing; and
   an anchor that couples an outer edge of the airbag to an outer edge of the support,
   wherein the support is configured to guide the anchor and the airbag in traveling from the stowed position to a deployed position spaced apart from the housing and the seat back.

2. The seat of claim 1, wherein the support comprises a telescoping panel configured to telescopically extend from the housing to guide the anchor in traveling from the stowed position to the deployed position in unison with deployment of the airbag.

3. The seat of claim 2, wherein the telescoping panel is configured to control a direction of deployment of the airbag.

4. The seat of claim 2, wherein the telescoping panel forms a reaction surface that abuts the airbag during deployment to restrain motion of an occupant relative to the seat.

5. The seat of claim 1, wherein the anchor extends elevationally between the outer edge of the support and the outer edge of the airbag in the deployed position in a manner parallel to a seat surface of the seat back.

6. The seat of claim 5, wherein the anchor is a flexible panel.

7. The seat of claim 5, wherein the anchor is a stitch line.

8. The seat of claim 1, wherein the housing, the airbag, and the support are covered by a seat surface of the seat in the stowed position.

9. The seat of claim 1, wherein the anchor is a first anchor, the outer edge of the support is a first outer edge of the support, and the outer edge of the airbag is a first outer edge of the airbag, the seat further comprising:
   a second anchor that couples a second outer edge of the airbag to a second outer edge of the support.

10. The seat of claim 9, wherein the support comprises rails configured to telescopically extend from the housing to guide the first and second anchors, respectively, in traveling from the stowed position to the deployed position in unison with deployment of the airbag.

11. A seat, comprising:
    a seat back having a seat surface;
    a housing defined within the seat back;
    an airbag having a stowed position disposed within the housing behind the seat surface; and
    a telescoping panel configured to telescopically extend from the housing to guide the airbag in traveling from the stowed position to a deployed position spaced apart from the housing and the seat surface.

12. The seat of claim 11, further comprising:
    an anchor that couples an outer edge of the airbag to an outer edge of the telescoping panel.

13. The seat of claim 12, wherein the anchor extends elevationally between the outer edge of the telescoping panel and the outer edge of the airbag in the deployed position in a manner parallel to the seat surface of the seat back.

14. The seat of claim 12, wherein the anchor is a flexible panel.

15. The seat of claim 11, wherein the telescoping panel forms a reaction surface that abuts the airbag during deployment to restrain motion of an occupant relative to the seat.

16. A restraint system for a seat, comprising:
    an airbag having a stowed position behind a surface of a seat back of a seat;
    a support having a stowed position behind the surface of the seat back; and
    an anchor that couples an outer edge of the airbag to an outer edge of the support,
    wherein the support is configured to guide the anchor and the airbag in traveling from the respective stowed positions to respective deployed positions that are spaced apart from the surface of the seat back.

17. The restraint system of claim 16, wherein the anchor is a flexible panel.

18. The restraint system of claim 16, wherein the anchor is a stitch line.

19. The restraint system of claim 16, wherein the anchor extends elevationally between the outer edge of the support and the outer edge of the airbag when the airbag and the support are in the respective deployed positions in a manner parallel to the seat surface of the seat back.

20. The restraint system of claim 16, wherein the support comprises a telescoping panel configured to guide the anchor in traveling in unison with deployment of the airbag, and wherein the telescoping panel forms a reaction surface for the airbag.

* * * * *